US006447300B1

(12) United States Patent
Greenberg

(10) Patent No.: US 6,447,300 B1
(45) Date of Patent: Sep. 10, 2002

(54) EDUCATIONAL CARD GAME

(75) Inventor: Joseph G. Greenberg, 21508 W. Juniper Ct., Plainfield, IL (US) 60544

(73) Assignee: Joseph G. Greenberg, Plainfield, IL (US)

(*) Notice: Subject to any disclaimer, the term of this patent is extended or adjusted under 35 U.S.C. 154(b) by 0 days.

(21) Appl. No.: 09/781,625

(22) Filed: Feb. 12, 2001

(51) Int. Cl.⁷ .................................................. G09B 19/02
(52) U.S. Cl. ...................... 434/188; 434/188; 434/209; 434/205; 273/299; 273/293; 273/302; 273/272; D21/379
(58) Field of Search ................................ 434/188–216; 273/292–308; D21/379

(56) References Cited

U.S. PATENT DOCUMENTS

| 4,173,834 A | 11/1979 | Arzola |
| 4,281,835 A | 8/1981 | Seiden |
| 4,957,443 A | 9/1990 | Schwartz |
| 5,505,458 A | 4/1996 | Blokh et al. |
| 5,551,700 A | 9/1996 | Druce et al. |
| 5,639,091 A | 6/1997 | Morales |
| 5,836,587 A | 11/1998 | Druce et al. |
| 5,868,393 A | 2/1999 | Williams |
| D409,672 S | * 5/1999 | Halbritter |
| 6,056,553 A | 5/2000 | Huang |
| 6,109,924 A | 8/2000 | Sanford, Sr. et al. |

FOREIGN PATENT DOCUMENTS

GB 2209234 * 4/1989

* cited by examiner

Primary Examiner—Derris H. Banks
Assistant Examiner—Dmitry Suhol
(74) Attorney, Agent, or Firm—Welsh & Katz, Ltd.; Thomas W. Tolpin

(57) ABSTRACT

An interesting educational game is provided which is fun, appealing, and effective to readily teach children arithmetic. The child-friendly educational game can include a set of playing cards. Each card can have a different graphical representation of one or more Arabic numerals corresponding to a number and can also have a word corresponding to another number. In order to further teach children words associated with numbers, each card has a graphical representation of a hand with pointed fingers, such that the number of pointed fingers corresponds to the numerical value of the word appearing on the playing card.

18 Claims, 3 Drawing Sheets

EDUCATIONAL CARD GAME

BACKGROUND OF THE INVENTION

This invention relates to educational games and, more particularly, to an educational card game for teaching children arithmetic.

Over the years, a variety of educational aids have been used to help teach children arithmetic, such as flash cards, instruction books, and a variety of mathematical games. Conventional flash cards, instruction books, and prior educational games have met with varying degrees of success.

While flash cards and instruction books can be useful with the assistance and in the presence of a teacher, teacher's aid, or instructor, such flash cards and instruction books are not usually fun nor motivating to children with the result that children rarely use flash cards and instruction books to learn arithmetic without being required to do so by a school teacher, etc. Some prior educational games are interesting, but most are complex, difficult to use, uninteresting and/or not fun and, therefore, do not successfully accomplish teaching children arithmetic.

It is, therefore, desirable to provide an improved educational game which overcomes most, if not all, of the preceding problems.

BRIEF SUMMARY OF THE INVENTION

An improved educational game is provided which is fun, interesting, and effective for children to learn arithmetic. Advantageously, the attractive educational game is easy to use, simply to manufacture, and economical.

The novel educational game can comprise a set of playing pieces such as tiles or preferably a deck of cards. Each set of playing pieces can have numerical indicia including a graphical representation of an Arabic numeral which corresponds to one number and a word which corresponds to another number. Desirably, each set of playing pieces also has an arithmetic symbol which represents an arithmetic operation. The arithmetic symbol can be: a plus (+), a minus (−) sign, a multiplication (×) sign, or a division (÷) sign. Preferably, the arithmetic symbol is positioned in proximity to the numerical indicia displayed on the playing pieces.

Each of the playing pieces can also have a equal (=) sign 101–110 which is positioned in proximity to the word in the numerical indicia. In the preferred form, the word comprises English letters and the graphical representation of the Arabic numeral(s) is larger in size than the letters of the word.

In order to make the educational game more interesting and easier to learn for young children, the numerical indicia of each playing piece can further comprise a graphical illustration of hand with one or more open fingers and closed fingers. Desirably, the number of open fingers in the graphical illustration of the hand corresponds to the numerical value and number represented by the word of the numerical indicia of the playing piece.

Advantageously, the user-friendly educational game helps motivate children to practice and study arithmetic by themselves without the assistance of a teacher. The attractive educational game can also be used by children for long periods of time while still being interesting and fun. If desired, the educational game can also be used as a computer game.

The improved educational game is especially useful for teaching children arithmetic. In the preferred form, each playing card has two numbers: a first number and a second number, which are added, subtracted, multiplied, or divided, depending on the arithmetic symbol and operation displayed on the playing card. Each card player (student or child) can be given a stack of cards. The first card player can put down a card, e.g. 4+3. The second card player can then place a card with the first number of his (her) card which equals the total, result, value or numerical quantity that is determined from calculation of the arithmetic operation displayed on the previous playing card, e.g. 7−1. The next player can then place a card on the table in which the first number of his (her) card equals the total, result, value or numerical quantity that is determined by calculation of the arithmetic operation of the previous card on the table, e.g. 6+4, etc. The first person to discard and place all the cards from his (her) stack of cards on the table wins the game.

A wild card can also be used to represent any total, result, value or numerical quantity of the previous card on the table or alternatively, any total, result, value or numerical quantity that is selected by the player.

A more detailed explanation of the invention is provided in the following description and appended claims taken in conjunction with the accompanying drawings.

DETAILED DESCRIPTION OF THE INVENTION

Figure 1:
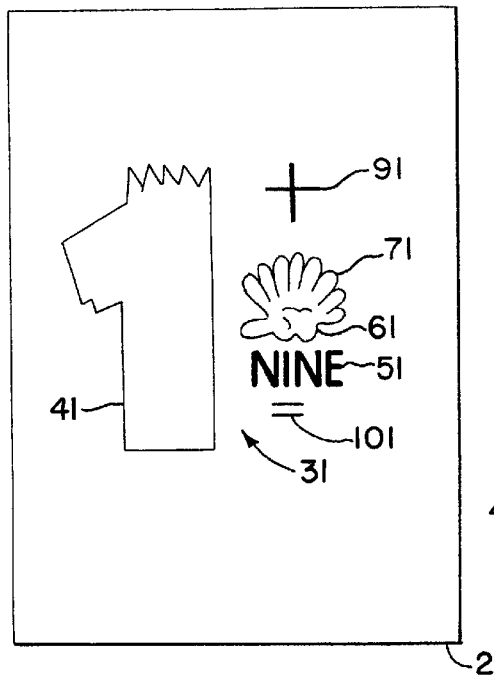
FIGS. 1–10 are front views of different playing cards of an educational card game in accordance with principles of the present invention.
Figure 2:
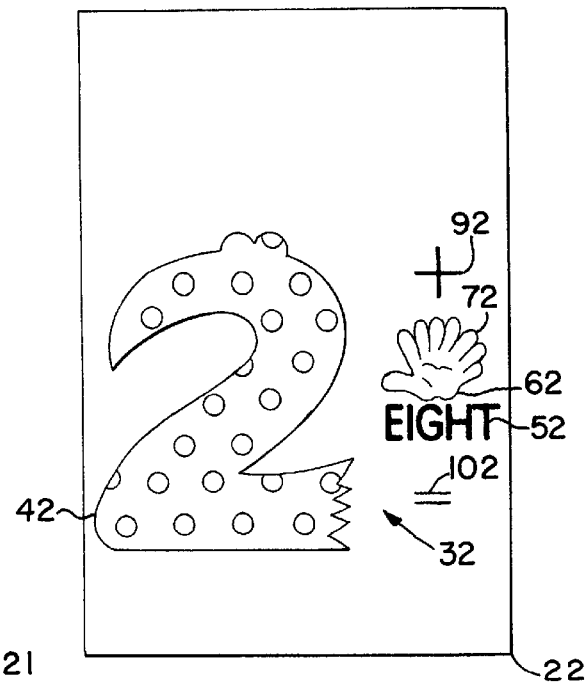
Figure 3:
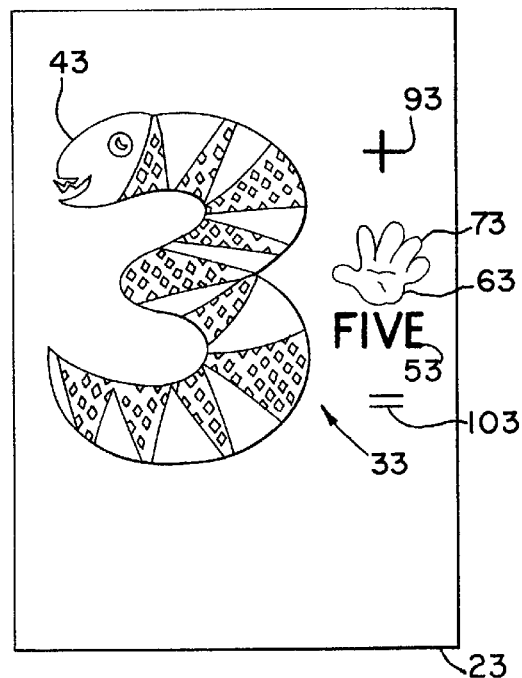
Figure 4:
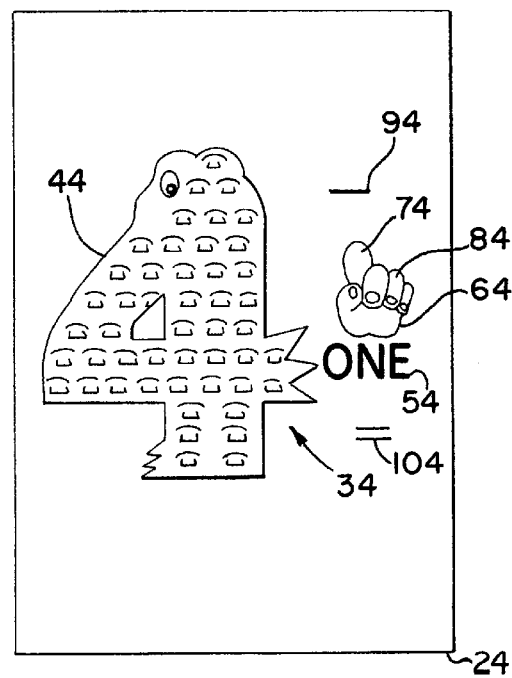
Figure 5:
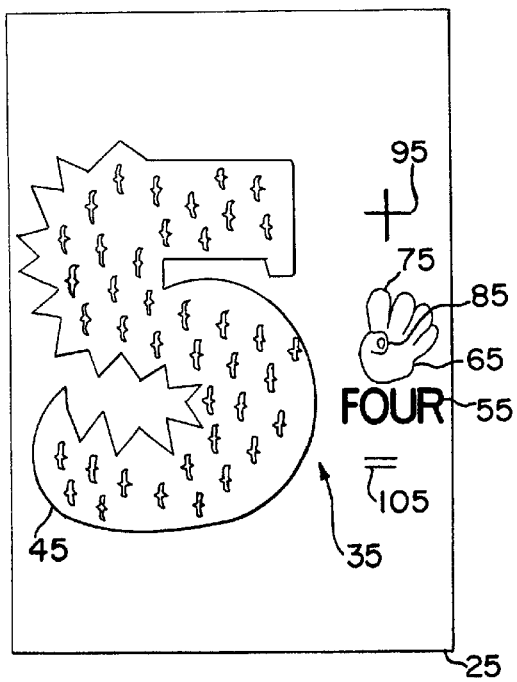

An educational card game, method and their uses according to the preferred embodiment of the present invention, will now be explained.

An educational card game 20 is provided which is fun and interesting for children. As shown in FIGS. 1–5, the educational card game can comprise a deck or stack with a set of alphanumeric playing cards 21–30 to help teach children arithmetic and words associated with numbers. Desirably, the front face of each of alphanumeric playing cards have, bear, and display a different array set or sequence of numerical indicia 31–40.

Each array, set or sequence or numerical indicia on the alphanumeric playing cards includes an enlarged graphical representation of one or more Arabic numericals, e.g. 41–50 corresponding to a number and a word 51–60, preferably an English word comprising English letters, corresponding to another number. In the preferred embodiment, the enlarged graphical representation of at least one Arabic numerical is substantially larger in size than the word appearing on the same playing card.

In order to help children correlate numbers with words, the array, set or sequence of numerical indicia on the playing cards preferably includes a graphical representation of a hand 61–70 with one or more open fingers 71–80 and optional closed fingers 84–86 and 90. The open finger(s) spread and point outwardly. In order to make the word on each playing card easy to learn for young children, the number of open, spread and/or pointed fingers of the graphical representation of the hand on the playing card corresponds to the numerical value of the word. In the illustrative embodiment, the hand is positioned in proximity to the word. For ease of playing the educational game, the graphical representation of the hand is substantially smaller in size than the enlarged graphical representation of the Arabic numeral(s).

Each of the playing cards can also have an arithmetic sign 91–100 positioned in proximity to the graphical representation of the hand to indicate an arithmetic operation. The arithmetic sign can be a plus (+) to indicate addition, a minus (−) sign to indicate subtraction, a multiplication (×) sign to indicate multiplication, or a division (÷) to indicate division. Furthermore, each of the playing cards preferably has an equal (=) sign that is positioned in proximity to and adjacent the word imprinted or displayed on the playing card.

In the illustrative embodiment, the arithmetic sign and the equal sign are aligned in vertical registration with both the graphical representation of the hand and the lettering of the word on each playing card. Preferably, the enlarged graphical representation of the Arabic numeral(s) expands a height and size which is greater than the height and size of the arithmetic sign, graphical representation of the hand, word, and equal sign, together on each playing card.

In illustrative embodiment, the alphanumeric playing cards comprise substantially rectangular playing cards. For convenience, the enlarged graphical representation of the Arabic numeral(s) can be positioned laterally to the left of the word, as well as to the left of the graphical representation of the hand. To make the educational game even more interesting for young children, the enlarged graphical representation of the Arabic numeral(s) can comprise a graphical representation of a reptile, bird and/or other animal. In some circumstances, it may be desirable to use other graphical representations of an Arabic numeral.

Significantly, at least one of the playing card has one of the enlarged graphical representations of an Arabic numeral (s) equal to the numerical quantity, value or result which is determined by calculating the array, set or sequence of numerical indicia of a different playing card in accordance with the arithmetic operation and arithmetic sign of the different playing card.

In use, one player (student or child) can display and discard a first playing card with one array, set or sequence of numerical indicia. Another player (child or student) or the same player can display and discard another playing card with a different enlarged graphical representation of an Arabic numeral(s) corresponding to the calculation of a numerical indicia on the first card. The previous player or another player can then display and discard a further playing card with a further enlarged graphical representation of an Arabic numeral(s) corresponding to the numerical indicia of the previously displayed and discarded playing card, etc. The game can then be played and continued in a similar manner until all the playing cards have been displayed and discarded on a table or other playing surface by the children playing the game.

Figure 6:
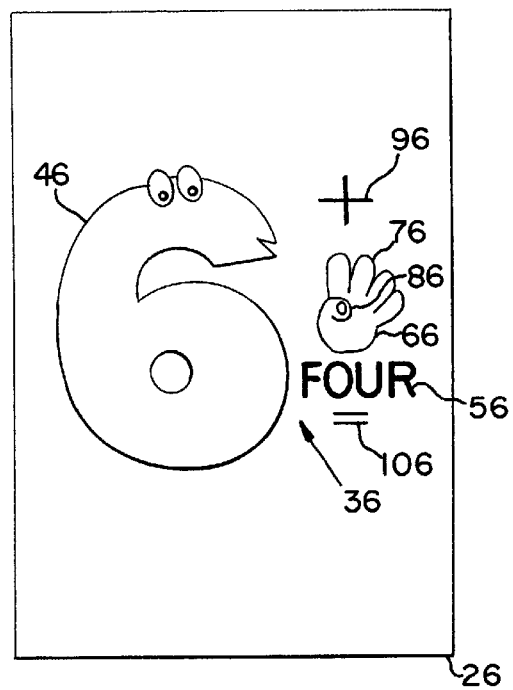
Figure 7:
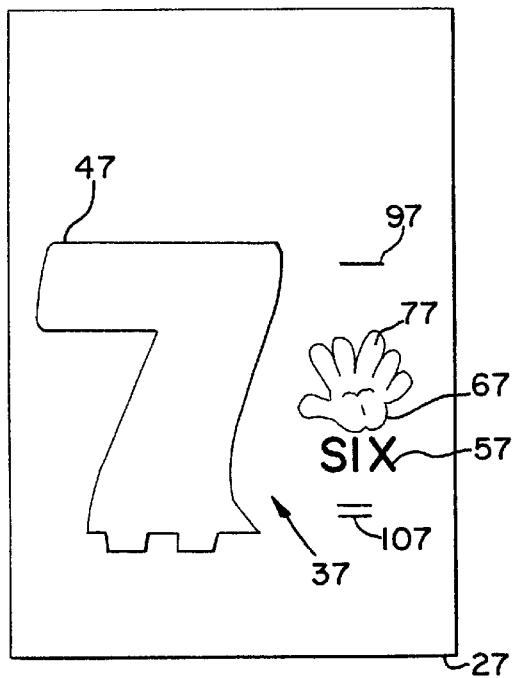
Figure 8:
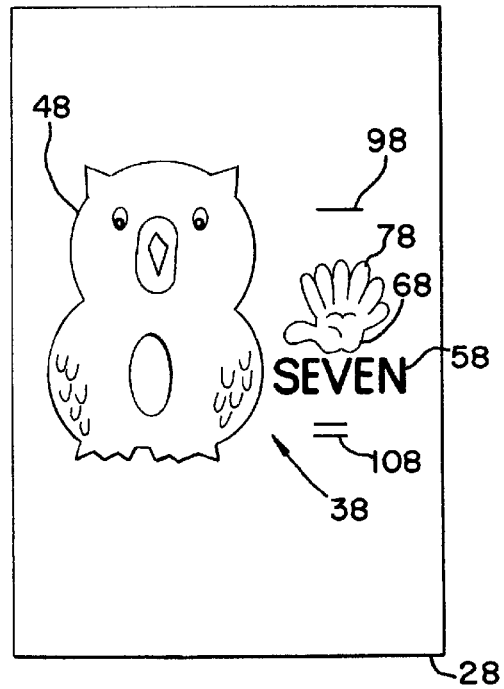
Figure 9:
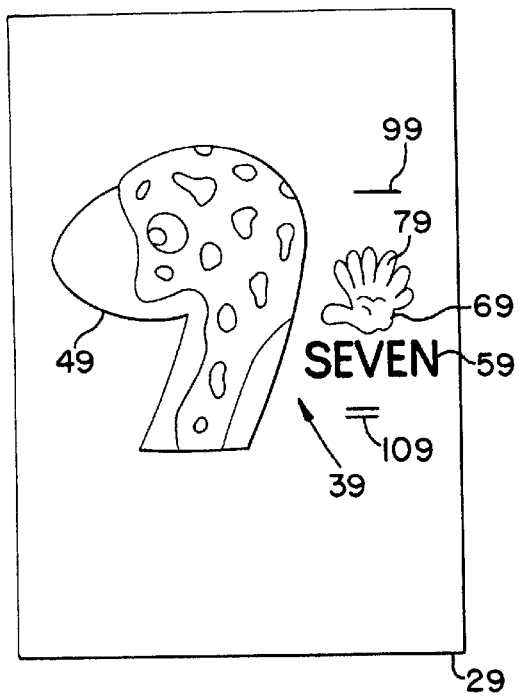
Figure 10:
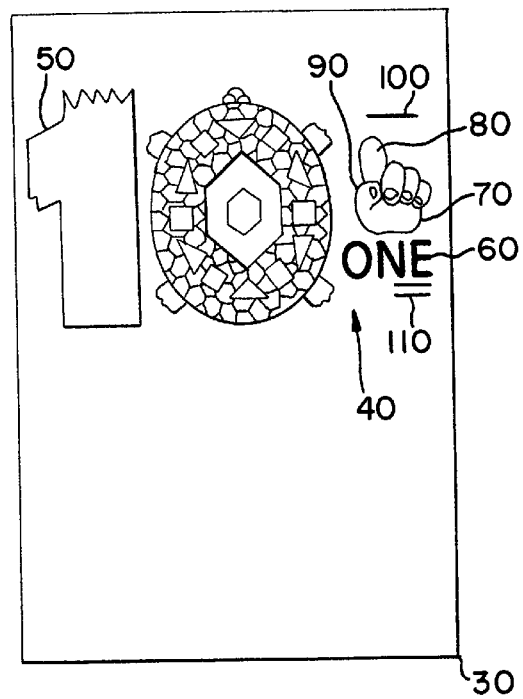
Figure 11:
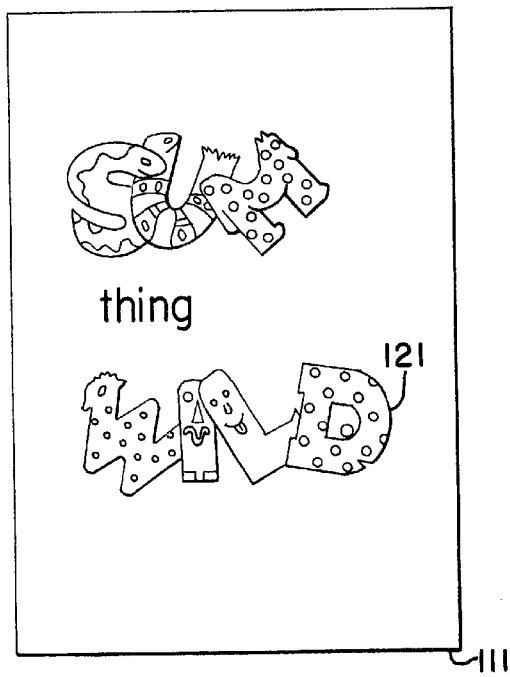
FIG. 11 is a front view of a wild card which can be used with the educational card game.

The playing cards can also include at least one wild card 111, such as shown in FIG. 6. Each wild card can have a wild card symbol 121 comprising one or more letters, words, graphical illustrations, and/or other indicia to represent any quantity, value, or result selected by a player holding or displaying the wild card or alternatively, can represent the quantity, value, or result of the arithmetic operation of the previously played card.

Among the many advantages of the educational card game of the invention are:
1. Outstanding educational value.
2. Superb method for teaching arithmetic.
3. Excellent appeal to children.
4. Simple to use.
5. Easy to manufacture.
6. Fun.
7. Exciting.
8. Safe.
9. Dependable.
10. Sturdy.
11. Economical.
12. Efficient.
13. Effective.

Although embodiments of this invention have been shown and described, it is to be understood that various modifications, substitutions and rearrangements of parts, indicia, game rules, and method steps, can be made by those skilled in the art without departing from the novel spirit and scope of this invention.

What is claimed is:
1. An educational game, comprising:
   a set of playing pieces selected from the group consisting of tiles and a deck of cards;
   each of said playing pieces having numerical indicia including
   a graphical display of an Arabic numeral designating a number providing a first number, and
   a word designating another number providing a second number, said word providing said second number being positioned adjacent said first number; and
   each of said playing pieces having an arithmetic symbol designating an arithmetic operation, and said arithmetic symbol being positioned adjacent said numerical indicia.
2. An educational game in accordance with claim 1 including an equal (=) sign positioned adjacent said word.
3. An educational game in accordance with claim 1 wherein said arithmetic symbol is a plus (+) sign or a multiplication (×) sign.
4. An educational game in accordance with claim 1 wherein said arithmetic symbol is a minus (−) or a division (÷) sign.
5. An educational game in accordance with claim 1 wherein said graphical display of said Arabic numeral is larger in size than said word.
6. An educational game in accordance with claim 1 wherein:
   said numerical indicia further comprises a graphical illustration of a hand with one or more open fingers, said number of open fingers identifying the numerical value of the word and identifying said another number; and
   said hand being positioned adjacent said word.
7. An educational game in accordance with claim 6 wherein:
   said word comprises English letters; and
   said hand is substantially smaller in size than said graphical display of said Arabic Numeral.
8. An educational game, comprising:
   a set of alphanumeric playing cards for teaching children arithmetic and words associated with numbers;
   each of said alphanumeric playing cards bearing and displaying a different array of numerical indicia;
   each array of numerical indicia including an enlarged graphical display of at least one Arabic numeral identifying a number and a word identifying another number, said enlarged graphical display of at least said one Arabic numeral being substantially larger in size than said word, said array of numerical indicia further including a graphical display of a hand with a number of fingers, said fingers comprising one or more open fingers spreading or pointing outwardly, said number of open, spread or pointed fingers identifying a numerical value of said word and identifying said another number, said hand being positioned adjacent said word, and said hand being substantially smaller in size than said enlarged graphic display of said at least one Arabic numeral;

an arithmetic sign positioned adjacent said hand for indicating an arithmetic operation, said arithmetic sign being selected from the group consisting of a plus (+) sign for indicating addition, a minus (−) sign for indicating subtraction, a multiplication (×) sign for indicating multiplication, and a division (÷) sign for indicating division;

an equal (=) sign positioned adjacent said word;

at least one of said playing cards having one of said enlarged graphical displays of said at least one Arabic numeral equal to the numerical quantity, value or result which is determined by calculating the array of numerical indicia of a different playing card in accordance with the arithmetic operation and arithmetic sign of said different playing card.

9. An educational game in accordance with claim 8 wherein said arithmetic sign is positioned in vertical alignment with said graphical display of said hand.

10. An educational game in accordance with claim 8 wherein said equal sign is positioned in vertical alignment with said word.

11. An educational game in accordance with claim 8 wherein said arithmetic sign and said equal sign are aligned in vertical registration with said graphical display of said hand and said word.

12. An educational game in accordance with claim 11 wherein said enlarged graphical display of said at least one said Arabic numeral spans a height and size greater than the height and size of said arithmetic sign, graphical display of said hand, word, and equal sign, together.

13. An educational game in accordance with claim 8 wherein said enlarged graphical display of said at least one said Arabic numeral is positioned laterally to the left of said word.

14. An educational game in accordance with claim 8 wherein said enlarged graphical display of at least one said Arabic numeral is positioned laterally to the left of said graphical display of said hand.

15. An educational game in accordance with claim 8 wherein said enlarged graphical display is selected from the group consisting of a reptile, bird and animal.

16. An educational game in accordance with claim 8 wherein said playing card includes at least one card identifying any quantity, value, or result selected by a player holding or displaying the card.

17. An educational game in accordance with claim 8 wherein said word identifying said another number is an English word comprising English letters.

18. An educational game in accordance with claim 17 wherein:

said arithmetic sign is selected from the group consisting of a plus (+) sign for indicating addition and a minus (−) sign for indicating subtraction; and said alphanumeric playing cards comprise substantially rectangular playing cards.

* * * * *